Patented Feb. 15, 1927.

1,617,350

UNITED STATES PATENT OFFICE.

PHILIPP SCHENITZA, OF ZURICH, SWITZERLAND.

MEANS FOR PREVENTING AND DISSOLVING SCALE IN STEAM BOILERS.

No Drawing. Application filed November 30, 1925, Serial No. 72,410, and in Germany January 29, 1925.

The invention relates to means for preventing and dissolving scale in steam boilers.

It is known that resins can be used for dissolving and preventing the formation of scale in boilers, and resins afford advantages in so far as, in consequence of their action, the mineral substances contained in the boiler feed water cannot separate out in the form of a close hard stone but are precipitated in the form of a fine sludge or slime. This action occurs more particularly when the resin is quite finely divided in the feed water, and in order to obtain this fine division gum resin has been used, which possesses the property that the gum which is present in it by nature holds the resin in the water in colloidal solution, that is to say it acts as a protective colloid. On the other hand the use of resins is open to objection in that the small quantities of oils which are contained therein or which arise from their being split up by high temperature and pressure, form an objectionable coating which is not easily permeable by heat, upon the sides of the boiler, whilst the resin itself together with the scale precipitated as sludge may cause a coating on the sides of the boiler which is unfavourable to the conduction of heat. These objections materially affect the working of the boiler and lead to considerable losses in energy in the form of heat.

According to the present invention a composition to be added to the feed water is provided which contains resin together with a protective colloid, but also contains certain additions, for instance of an inorganic nature such as borax and waterglass, which obviate the above mentioned disadvantages.

As resins with protective colloids for obtaining such emulsions, gum resins can be used which consist by nature of a mixture of resin and gum. On being dissolved, the gum forms a solution and holds the resin which is brought into a finely divided form owing to the prevailing pressure and temperature in the holder, in the form of an emulsion. The same result may, however, be obtained if a suitable resin as colophony or dammar resin is used to which additions are made such as gum as gum arabic and agaragar or casein or both, as protective colloids, by which means also an emulsification of the resin is effected owing to the prevailing pressure and temperature conditions in the boiler. The formation of an emulsion is further assisted by the addition of substances of an inorganic nature such as borax and waterglass which besides having the effect of preventing the separation out of an oil contained in the resins utilized, usually ethereal oils, and coating on the sides of the boiler, since they counteract the formation of oil, also possess the property that they disintegrate and soften up any hard scale that may have already formed, so that it is converted into a porous mass which assists the operation of the resin. By rendering the mass porous or disintegrating or cracking it the colloids are enabled to enter therein and cause its removal. At the same time these agencies have the advantage that they do not in any way attack the metal of the boiler. An addition of ultramarine serves as a protection against corrosion and the formation of rust by the formation of a thin film of FeS.

The following example of the composition is given:

|   | Per cent |
|---|---|
| Resin as colophony | 50 |
| Gum arabic | 20 |
| Borax | 10 |
| Waterglass | 10 |
| Ultramarine | 10 |

The resin is crushed or ground and the ingredients are mixed dry in powdered or granular form.

The exact proportions of the ingredients may be varied according to the character of the water used.

The quantities of this mixture to be employed vary according to the character of the water between 50 and 100 grammes to 1000 litres of feed water.

There are cases in which the composition described only works extremely slowly on the formed scale. In these cases the operation can be accelerated by allowing a weak solution (e. g. 2%) of an organic acid such as pyroligneous, formic, lactic, citric or acetic acid, to act on the scale, the boiler remaining open meanwhile until the acid has been neutralized by the scale, before the above described composition is used.

I claim:

1. A composition for preventing and for dissolving scale in steam boilers, comprising a resin and a protective colloid, and borax and waterglass.

2. A composition for preventing and dissolving scale in steam boilers, comprising a resin, a gum, and borax and waterglass.

3. A composition for preventing and for dissolving scale in steam boilers, comprising a resin and a protective colloid, borax and waterglass, and ultramarine.

4. A composition for preventing and for dissolving scale in steam boilers, comprising a resin, a gum, borax and waterglass, and ultramarine.

5. A composition for preventing and for dissolving scale in steam boilers, comprising 50% of a resin, 20% of a gum, 10% of borax, 10% of waterglass and 10% of ultramarine.

6. A process for preventing and for dissolving scale in steam boilers, which consists in adding to the feed water in the boiler a composition comprising a resin and a protective colloid and borax and waterglass at the rate of 50 to 100 grammes of the composition to 1000 litres of feed water.

In testimony whereof, I have signed my name to this specification.

PHILIPP SCHENITZA.